C. A. KIEL.
BALL AND SOCKET PIPE JOINT.
APPLICATION FILED JULY 7, 1911.
1,022,197.
Patented Apr. 2, 1912.
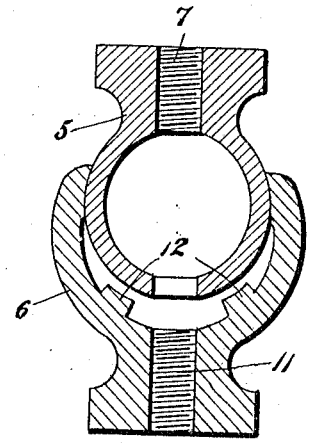
Witnesses
M. R. Wilson
J. Miller
Inventor
Clemens A. Kiel
By Max A. Schmidt
Attorney

UNITED STATES PATENT OFFICE.

CLEMENS A. KIEL, OF LOUISVILLE, KENTUCKY.

BALL-AND-SOCKET PIPE-JOINT.

1,022,197. Specification of Letters Patent. Patented Apr. 2, 1912.

Application filed July 7, 1911. Serial No. 637,348.

*To all whom it may concern:*

Be it known that I, CLEMENS A. KIEL, a citizen of the United States, residing at Louisville, in the county of Jefferson and State of Kentucky, have invented certain new and useful Improvements in Ball-and-Socket Pipe-Joints, of which the following is a specification.

This invention relates to a novel and improved form of ball-and-socket pipe-joint, the object of the invention being to provide a joint of this kind which consists of only two pieces, and which is formed by casting the socket member around the finished ball member of the joint.

In order that the invention may be better understood, reference is had to the accompanying drawing forming a part of this specification, in which drawing a central vertical section of the complete joint is shown.

Referring specifically to the drawing, the joint consists of a ball member 5, and a socket member 6. The ball member is first cast, and then finished true on the outside, and a thread 7 is cut in the bore of its neck, after which the socket member is cast around the ball member. The ball member is hollow, and the bore of its neck opens thereinto. The socket member also has a neck provided with a threaded bore 11 opening into the interior of said member. Inside the socket member are two lugs 12 to limit the movement of the ball member in that direction.

The joint herein described has only two parts, and it can be easily and cheaply manufactured.

The preferred embodiment of the invention has been shown, but it will be understood that various minor changes may be made without a departure from the spirit and scope of the invention.

The socket member extends around the major portion of the ball member and past the center thereof, and its inner end is in sliding contact with the ball member at a point beyond the center thereof, in view of which endwise separation of the two members is prevented. This arrangement also renders unnecessary a packing, stuffing box, retaining ring or other devices usually employed for preventing endwise separation of the joint members. The structure is therefore greatly simplified, the complete joint consisting of only two members.

I claim:

A two-part ball-and-socket pipe-joint comprising a hollow ball-member having a hollow neck opening thereinto, and a socket-member extending around a major portion of the ball-member and in sliding contact with a narrow zone thereof beyond the center of said ball-member to form a metal-to-metal contact only, and to prevent endwise separation of the members, said socket-member having a neck provided with a bore which opens into the inside of said member.

In testimony whereof I affix my signature in presence of two witnesses.

CLEMENS A. KIEL.

Witnesses:
HARRY MOUTH,
CLEMENS KIEL, Sr.